(12) United States Patent
Puchala et al.

(10) Patent No.: US 12,299,539 B2
(45) Date of Patent: May 13, 2025

(54) QUANTUM PROBABILISTIC ERROR CORRECTION METHOD

(71) Applicant: Instytut Informatyki Teoretycznej i Stosowanej Polskiej Akademii Nauk, Gliwice (PL)

(72) Inventors: Zbigniew Puchala, Gliwice (PL); Ryszard Kukulski, Gliwice (PL); Lukasz Pawela, Gliwice (PL)

(73) Assignee: Instytut Informatyki Teoretycznej i Stosowanej Polskiej Akademii Nauk, Gliwice (PL)

( * ) Notice: Subject to any disclaimer, the term of this patent is extended or adjusted under 35 U.S.C. 154(b) by 0 days.

(21) Appl. No.: 18/109,437

(22) Filed: Feb. 14, 2023

(65) Prior Publication Data
US 2023/0306295 A1 Sep. 28, 2023
US 2025/0037002 A2 Jan. 30, 2025

(30) Foreign Application Priority Data

Feb. 14, 2022 (EP) ..................... 22156614

(51) Int. Cl.
*G06N 10/70* (2022.01)
(52) U.S. Cl.
CPC ..................... *G06N 10/70* (2022.01)
(58) Field of Classification Search
None
See application file for complete search history.

(56) References Cited

U.S. PATENT DOCUMENTS 5,768,297 A 6/1998 Shor

OTHER PUBLICATIONS

Ashikhmin, Alexei, "Fidelity of a Quantum ARQ Protocol", 2006 IEEE Theory Workshop, Mar. 13-17, 2006. 5 pages.
(Continued)

*Primary Examiner* — Guerrier Merant
(74) *Attorney, Agent, or Firm* — Polson Intellectual Property Law P.C.; Margaret Polson; Christopher Sylvain

(57) ABSTRACT

A quantum computer implemented probabilistic error correction method for use with quantum circuits with a noise channel N(X) that has a Choi rank not greater than two, such as $N(X)=N_0 X N_0^\dagger + N_1 X N_1^\dagger$. The method comprising steps of: encoding a first qubit into an encoded state $|\psi\rangle$, putting a second qubit into an arbitrary fixed state $|d_1\rangle$, implementing two qubit unitary operation $U_E$ on the first qubit and the second qubit to obtain an encoded state $U_E(|\psi\rangle \otimes |d_1\rangle)$, and after the encoded state is affected by the noise N(X), implementing two qubit unitary operation $U_D$, followed by measuring the second qubit in the $\{|d_2\rangle, |d_2^\perp\rangle\}$ basis measurement to obtain a classical label $i \in \{0,1\}$, next preparing a third qubit in the arbitrary fixed state $|d_3\rangle$, and implementing two qubit unitary operation $V_D$ on the first qubit and the third qubit, followed by measuring the third qubit in the $\{|d_4\rangle, |d_4^\perp\rangle\}$ basis measurement to obtain a classical label $j \in \{0,1\}$, and when $(i,j)=(0,0)$ accepting as an output $\delta_{exp}$ a decoded state of the first qubit, and when $(i,j) \neq (0,0)$ rejecting the output $\delta_{exp}$ of a decoded state of the first qubit.

6 Claims, 1 Drawing Sheet

(56) References Cited

OTHER PUBLICATIONS

Koashi, Masato, et al, "Reversing Measurement and Probabilistic Quantum Error Correction", Physical Review Letters, vol. 82, No. 12, Mar. 22, 1999, pp. 2598-2601. 4 pages.
Fern, Jesse, et al, "Probabilistic quantum error correction", Cornell University, arxiv.org, Oct. 7, 2002. 9 pages.
Girard, Mark, et al, "On the mixed-unitary rank of quantum channels", Cornell University, arxiv.org, Apr. 1, 2020. 34 pages.
Kukulski, Ryszard, et al, "On the probabilistic quantum error correction", Cornell University, arxiv.org, Jun. 13, 2022. 28 pages.
Extended European Search Report dated Jul. 15, 2022 in priority European application EP22156614.4. 8 pages.

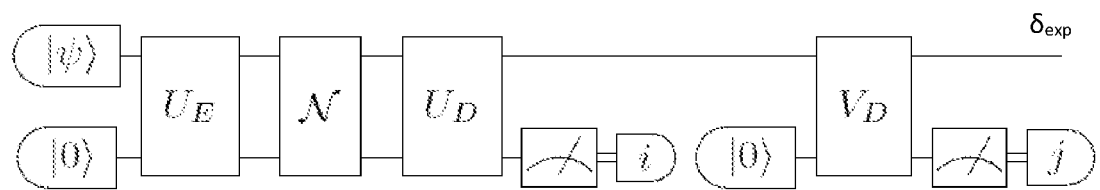

QUANTUM PROBABILISTIC ERROR CORRECTION METHOD

The present invention relates to a quantum computer implemented probabilistic error correction method for use in quantum circuits. Invention finds its application in quantum information systems in particular in a quantum communication channels.

In the prior art a number of quantum error correction technics is known.

Perfect reconstruction codes. In the publication of Knill Emanuel, Raymond Laflamme, and Lorenza Viola, "Theory of quantum error correction for general noise" Physical Review Letters 84.11 (2000): 2525. A general description of arbitrary system-environment couplings in terms of a graded interaction algebra is disclosed. The degree of an operator in this algebra both determines the temporal order and the extent to which the operator can affect the system, independent of the internal evolution of the environment. In the case of qubits with independent one-qubit interactions, this notion coincides with the usual concepts of "number of errors" or "error weight" used in combinatorial error analysis. It is disclosed that the generalization of minimum distance relates to error correction in the usual way and show that, irrespective of the nature of the environmental noise, large codes exist depending solely on the dimension of the linear space of errors of a given order. This publication discloses an error correction code that requires at least four qubits to work. The proof exists that in order work with probability of success equal to one and to recover information form the channel affected by the noise of Choi rank not greater than two, it needs to use more than two qubits.

Approximate error correction codes. The publication Berta Mario, et al. "Semidefinite programming hierarchies for constrained bilinear optimization." Mathematical Programming (2021): 1-49, discloses asymptotically converging semidefinite programming hierarchies of outer bounds on bilinear programs of the form $Tr[H(D\otimes E)]$ maximized with respect to semidefinite constraints on D and E. Such hierarchies when applied to the problem of approximate error correction in quantum information theory, give hierarchies of efficiently computable outer bounds on the success probability of approximate quantum error correction codes in any dimension. The approximate error correction codes by design return approximate encoded state and they do not allow for perfect recovery of the initial state.

Probabilistic error correction codes. In the publication Mackay David J C, Graeme Mitchison, and Paul L. McFadden. "Sparse-graph codes for quantum error correction." IEEE Transactions on Information Theory 50.10 (2004): 2315-2330 the authors explored the conjecture that the best quantum error-correcting codes will be closely related to the best classical codes. By converting classical low-density parity-check codes into quantum codes, the authors hope to find families of excellent quantum codes. The approach relies on further conjecture claiming that practical decoding algorithms have been found for classical low-density parity-check codes, it seems likely that a practical decoding algorithm will also exist for quantum low-density parity-check codes. It also discloses the stabilizer formalism for describing quantum error-correcting codes that encode a quantum state of K qubits in N qubits, and explains how a general stabilizer code is related to a classical binary code.

In the publication Koashi Masato, and Masahito Ueda "Reversing measurement and probabilistic quantum error correction." Physical review letters 82.12 (1999): 2598, a general characterization of probabilistically reversible measurements is presented. Further it is proposed that such probabilistic reversal serves as a means of error correction in quantum computation, which would be particularly useful when the numbers of qubits and gate operations are limited.

The publication Fern, Jesse, and John Terilla "Probabilistic quantum error correction." arXiv preprint quant-ph/0209058 (2002), examines, within the context of stabilizer codes, the conditions under which a code may correct errors on more qubits than it is guaranteed to fix and gives a framework in which to compute the probabilities that an arbitrary error will be corrected. During the course of quantum error correction, an error syndrome is measured and the correction procedure continues dependent on this measurement. As a second application of probabilistic error correction, the likelihood that error correction will succeed given that a particular syndrome is measured is analyzed. This likelihood, is called the syndrome quality, may enhance the effectiveness of a quantum information process for which quantum error correction plays a role. For example, it is conceivable that a quantum information process may benefit from aborting a subroutine if at some point a syndrome of especially low quality is measured.

In the publication Delfosse, Nicolas, Ben W. Reichardt, and Krysta M. Svore "Beyond single-shot fault-tolerant quantum error correction." IEEE Transactions on Information Theory (2021), in this publication, it is demonstrated that fault-tolerant quantum error correction can be achieved using $O(d \log(d))$ measurements for any code with distance $d \geq \Omega(n^\alpha)$ for some constant $\alpha) 0$. Moreover, we prove the existence of a sub-single-shot fault-tolerant quantum error correction scheme using fewer than r measurements. In some cases, the number of parity check measurements required for fault-tolerant quantum error correction is exponentially smaller than the number of parity checks defining the code.

Probabilistic codes are known as it is described above, however it is important to notice that these are mostly codes with stabilizers operating on a mesh of nine qubits in the Pauli basis. The noise models of known probabilistic codes do not allow for correction of all errors of Choi rank at most two.

The present invention provides a probabilistic quantum error correction code that encodes one qubit of information, operates on two data qubits, corrects errors generated by noise channel of Choi rank not greater than two. Further the present invention provides an error correction procedure that has a positive probability that it will succeed, and in such a case, the procedure returns classical information indication showing its status. If the error correction procedure succeeds it perfectly recovers the initial state. This set of advantageous features is not known to exists in any of the know quantum error correction methods.

Further the present invention relates to an encoder and decoder that operate according to a probabilistic quantum error correction code.

Present invention has been presented below in a preferred embodiment in reference to drawings, where FIG. 1 shows a schematic quantum circuit implementing an invention.

Quantum computing systems incorporate a classical part of the system and a quantum part of the system. The classical part of the quantum system is responsible for setting up a quantum circuit and processing the output of the quantum circuit, while the quantum part of the system is responsible for running the quantum computation process. Both parts of the quantum computing system cannot be separated as the uncontrolled quantum circuit without a classic setup process would produce no meaningful results and classic part of the quantum computing system—without a quantum circuit—is not able to benefit from quantum effects present only in the quantum circuit. Technical effects observed in the quantum system can be classified as direct technical effects involving interaction between qubits, and further technical effects as seen from the perspective of a quantum communication system end expressing themselves in correction of errors and improved more reliable quantum communication system.

The language of the following disclosure is a quantum computing language and it is assumed the reader is familiar with mathematical notation involved in this field of technology, in particular with complex numbers, matrix linear algebra in Hilbert spaces, the notation of orthogonal vectors $|\cdot^\perp\rangle$, transposition T, and conjugate transposition †.

In the FIG. 1 a scheme representing QEC (Quantum Error Correction) procedure is shown, it is a quantum part of the quantum communication scheme. In the classic part the quantum error scheme requires preparation of unitary matrices $U_E$, $U_D$ and $V_D$. At the beginning of the procedure one has access to two data qubits. The first one is in a state $|\psi\rangle$. This qubit will be encoded with an information. The second qubit is put into a ground state $|0\rangle$. In the description we use the second qubit in a ground state $|0\rangle$ however the second qubit can be put into any arbitrary fixed state $|d_1\rangle$ without departing from the scope of the invention. In the next step the initial state of both qubits goes under two-qubit unitary operation $U_E$, this means a rotation of a state vector in a four dimensional Hilbert space.

Then the encoded state $U_E(|\psi\rangle \otimes |0\rangle)$ is affected by the noise N. This procedure works with quantum circuits with a noise channel $N(X)$ that has a Choi rank not greater than two, such as $N(X)=N_0 X N_0^\dagger + N_1 X N_1^\dagger$. This error noise cannot be corrected by any known probabilistic nor perfect QEC codes acting on two qubits only.

After that, we start the decoding procedure by implementing two-qubit unitary operation $U_D$ which is unitary rotation of an error affected vector state in a four dimensional Hilbert space. The next step of the procedure is measuring the second qubit in the standard basis to obtain a classical label $i \in \{0,1\}$. In the description we use a measurement of the second qubit in a standard basis, however the measurement of the second qubit can be done by a projective measurement in arbitrary basis $\{|d_2\rangle, |d_2^\perp\rangle\}$, without departing from the scope of the invention.

The next step of the procedure is preparing a third qubit in the ground state $|0\rangle$. The same as in the case of the second qubit, in the description we use the third qubit in a ground state $|0\rangle$ however the third qubit can be put into any arbitrary fixed state $|d_3\rangle$, without departing from the scope of the invention.

Having such a circuit the next step of the procedure is to implement two qubit unitary operation $V_D$ on the first qubit and the third qubit, followed by measuring the third qubit in the standard basis to obtain a classical label $j \in \{0,1\}$. The same as in the case of the second qubit in the description we use a measurement of the third qubit in a standard basis, however the measurement of the third qubit can be done by a projective measurement in arbitrary basis $\{|d_4\rangle, |d_4^\perp\rangle\}$ without departing from the scope of the invention.

In the final step the procedure is conditioned by the classical labels i,j and when (i,j)=(0,0) accepting as an output $\delta_{exp}$ a decoded state of the first qubit, and when (i,j)≠(0,0) rejecting the output $\delta_{exp}$ of a decoded state of the first qubit.

Preferably when the output $\delta_{exp}$ is rejected the method further comprising a step of initiating an automatic resend request for the encoded state $|\psi\rangle$ on the first qubit.

The encoding scheme according to the invention is described in detail below starting with the N to be a two-qubit noise channel, such that its Choi rank is no greater than two. Having this assumption a probabilistic quantum error correction code for noise N is proposed, which in the classical part of the procedure defines unitary matrices $U_E$, $U_D$, and $V_D$.

The noise N can be written in the Kraus representation as $$N(X)=N_0 X N_0^\dagger + N_1 X N_1^\dagger.$$

A four by two encoding matrix E can be found such that $E^\dagger E = \mathbb{1}_2$. Further a two by four decoding matrix D can be found, such that $\|D\|_\infty \leq 1$ for which $$DN_0 E \propto \mathbb{1}_2,$$

$$DN_1 E \propto \mathbb{1}_2,$$

$$DN_0 E \neq 0 \lor DN_1 E \neq 0.$$

The matrices E, D create a valid error correction scheme (E,D) for noise N as $$D(N(EXE^\dagger))D^\dagger = pX.$$

For some $p \in (0,1]$ and any two by two matrix X.

The matrix $U_E$ is the four by four unitary matrix that satisfies $$U_E(\mathbb{1}_2 \otimes |0\rangle)=E.$$

The matrix $U_D$ is the four by four unitary matrix that satisfies $$U_D|t_1\rangle = |0,0\rangle,$$

$$U_D|t_2\rangle = |1,0\rangle,$$

for singular value decomposition of $D=\sigma_1|z_1\rangle\langle t_1| + \sigma_2|z_2\rangle\langle t_2|$.

For the matrix $D'=DU_D^\dagger(\mathbb{1}_2 \otimes |0\rangle)$, one can define the matrix $V_D$ which satisfies $$(\mathbb{1}_2 \otimes \langle 0|)V_D(\mathbb{1}_2 \otimes |0\rangle)=D'.$$

Having defined unitary operations $U_E$, $U_D$ and $V_D$ one can run the quantum part of the procedure as described in relation to FIG. 1 for initial state $|\psi\rangle$. Then having the output state $\delta_{exp}$ of the procedure from FIG. 1 in the post processing of the measurements outputs (i,j), when (i,j)=(0,0) then the output $\delta_{exp}$ is accepted and $\delta_{exp}=|\psi\rangle\langle\psi|$, and when (i,j)≠(0,0) the output $\delta_{exp}$ is rejected.

In the preferable embodiment of the invention matrices E and D are constructed as described in detail below.

In the first step calculate the singular decomposition of $N_0$ and $N_1$ in the form of $$N_0=U_0 \lambda_0 V,$$

$$N_1=U_1 \lambda_1 V,$$

where $U_0$, $U_1$, V are unitary matrices, and $\lambda_0$, $\lambda_1$ are diagonal, positive semidefinite matrices.

Define Ancillary Vectors $$|x_i\rangle = (\lambda_0)_{ii} U_0 |i\rangle, i=0,\ldots,3,$$

$$|y_i\rangle = (\lambda_1)_{ii} U_1 |i\rangle, i=0,\ldots,3,$$

Define vectors $|E_0\rangle, |E_1\rangle, |D_0\rangle, |D_1\rangle \in \mathbb{C}^4$ according to the construction, which depends on one of the following cases:

First case: There exists $i_3 \in \{0,\ldots,3\}$ such that vectors $|x_{i_3}\rangle, |y_{i_3}\rangle$ are linearly independent.

Define indices $i_0, i_1, i_2 \in \{0, \ldots, 3\}$, such that $\{i_0, \ldots, i_3\}$ covers the whole set $\{0, \ldots, 3\}$. Let $(a_0, a_1, a_2)^T \in \mathbb{C}^3$ be a normed vector orthogonal to vectors $(\langle y_{i_3}|x_{i_0}\rangle, \langle y_{i_3}|x_{i_1}\rangle, \langle y_{i_3}|x_{i_2}\rangle)^\dagger$ and $(\langle x_{i_3}|y_{i_0}\rangle, \langle x_{i_3}|y_{i_1}\rangle, \langle x_{i_3}|y_{i_2}\rangle)^\dagger$. Orthogonalization can obtained by the use of the Gram-Schmidt orthogonalization method. Take $|E_1\rangle = |i_3\rangle$ and $|E_0\rangle = a_0|i_0\rangle + a_1|i_1\rangle + a_2|i_2\rangle$.

Define $|x\rangle = a_0|x_{i_0}\rangle + a_1|x_{i_1}\rangle + a_2|x_{i_2}\rangle$ and $|y\rangle = a_0|y_{i_0}\rangle + a_1|y_{i_1}\rangle + a_2|y_{i_2}\rangle$. If $|x\rangle \neq 0$ take $|D_0\rangle = |x\rangle$, else take $|D_0\rangle = |y\rangle$.

Define $$(b_0, b_1)^T = \begin{bmatrix} \langle x_{i_3}|x_{i_3}\rangle & \langle y_{i_3}|x_{i_3}\rangle \\ \langle x_{i_3}|y_{i_3}\rangle & \langle y_{i_3}|y_{i_3}\rangle \end{bmatrix}^{-1} (\langle D_0|x\rangle, \langle D_0|y\rangle)^T.$$

Take $|D_1\rangle = \bar{b}_0|x_{i_3}\rangle + \bar{b}_1|y_{i_3}\rangle$.

Second case: There exists a pair of vectors $|y_{i_0}\rangle$, $|y_{i_1}\rangle$ for $i_0 \neq i_1$, such that $|y_{i_0}\rangle = |y_{i_1}\rangle = 0$.

Define $|E\rangle = |i_0\rangle$, $|E_1\rangle = |i_1\rangle$, $|D_0\rangle = |x_{i_0}\rangle$ and $|D_1\rangle = |x_{i_1}\rangle$.

Third case: For all $i \in \{0, \ldots, 3\}$ vectors $|x_i\rangle$, $|y_i\rangle$ are not linearly independent and there is at most one zero vector $|y_{i_3}\rangle$ for some $i_3 \in \{0, \ldots, 3\}$.

Define indices $i_0, i_1, i_2 \in \{0, \ldots, 3\}$, such that $\{i_0, \ldots, i_3\}$ covers the whole set $\{0, \ldots, 3\}$.

Define the matrix $$M = \begin{bmatrix} \langle y_{i_0}|x_{i_0}\rangle & \langle y_{i_1}|x_{i_1}\rangle & \langle y_{i_2}|x_{i_2}\rangle \\ \langle y_{i_0}|y_{i_0}\rangle & \langle y_{i_1}|y_{i_1}\rangle & \langle y_{i_2}|y_{i_2}\rangle \end{bmatrix}.$$

Subcase a) Rank(M)=1

Define $b = \dfrac{\langle y_{i_1}|y_{i_1}\rangle}{\langle y_{i_0}|y_{i_0}\rangle}$.

Define $|E_0\rangle = |i_0\rangle$, $|E_1\rangle = |i_1\rangle$, $|D_0\rangle = |y_{i_0}\rangle$ and $|D_1\rangle = \dfrac{1}{b}|y_{i_1}\rangle$.

Subcase b) Rank(M)=2

Define indices $j_1, j_2 \in \{0, 1, 2\}$ such that $$\mathrm{rank}\left(\begin{bmatrix} M_{0j_1} & M_{0j_2} \\ M_{1j_1} & M_{1j_2} \end{bmatrix}\right) = 2.$$

Define $j_0 \in \{0, 1, 2\}$, as the remaining label, such that $\{j_0, j_1, j_2\}$ covers the whole set $\{0, 1, 2\}$. Take $|E_0\rangle = |i_{j_0}\rangle$, $$|D_0\rangle = |y_{i_{j_0}}\rangle.$$

Define $$(b_1, b_2)^T = \begin{bmatrix} \langle y_{i_{j_1}}|x_{i_{j_1}}\rangle & \langle y_{i_{j_2}}|x_{i_{j_2}}\rangle \\ \langle y_{i_{j_1}}|y_{i_{j_1}}\rangle & \langle y_{i_{j_2}}|y_{i_{j_2}}\rangle \end{bmatrix}^{-1} (\langle y_{i_{j_0}}|x_{i_{j_0}}\rangle, \langle y_{i_{j_0}}|y_{i_{j_0}}\rangle)^T.$$

Take $|E_1\rangle = |i_{j_1}\rangle + |i_{j_2}\rangle$ and $|D_1\rangle = \bar{b}_1|yi_{j_1}\rangle + \bar{b}_2|yi_{j_2}\rangle$.

Having the vectors $|E_0\rangle$, $|E_1\rangle$, $|D_0\rangle$, $|D_1\rangle \in \mathbb{C}^4$ constructed, define
a four by two matrix $E_* = V^\dagger(|E_0\rangle\langle 0| + |E_1\rangle\langle 1|)$,
and a two by four matrix $D_* = |0\rangle\langle D_0| + |1\rangle\langle D_1|$.

Define $$E = E_*(E_*^\dagger E_*)^{-0.5}$$

$$D = \frac{(E_*^\dagger E_*)^{0.5} D_*}{|(E_*^\dagger E_*)^{0.5} D_*|_\infty}$$

The matrices E and D allow to create unitary matrices $U_E$, $U_D$, $V_D$ according to the invention as it was described above.

To implement the error correction procedure according to the invention it is necessary to implement two qubit unitary matrix, ground state preparation and standard basis one qubit measurement. This can be implemented in a standard architecture provided by IonQ. Architecture provided by IonQ offers ground state $|0\rangle$ preparation, Z-basis measurement (measurement in Z axis of Pauli basis), and one qubit unitary gates, native gates $$GPI(\phi) = \begin{bmatrix} 0 & \exp(-i\phi) \\ \exp(i\phi) & 0 \end{bmatrix},$$

$$GPI2(\phi) = \frac{1}{\sqrt{2}} \begin{bmatrix} 1 & -i\exp(-i\phi) \\ -i\exp(i\phi) & 1 \end{bmatrix},$$

A Virtual Gate $$GZ(\theta) = \begin{bmatrix} \exp\left(\dfrac{-i\theta}{2}\right) & 0 \\ 0 & \exp\left(\dfrac{i\theta}{2}\right) \end{bmatrix},$$

and
a Two-Qubit Native Mølmer-Sørenson Gate $$MS(0.25\pi) = \exp(-0.25\pi i \times \sigma_x \otimes \sigma_x).$$

By using a composition of gates $GPI(0)GPI(\phi)GPI2(0)$ it is possible to implement arbitrary rotation along Y-axis (in a Pauli basis). It is also possible to implement CNOT gate as it is shown in shown in technical documentation and examples at https://quantumai.google/cirq/tutorials/educators/ion_device. Therefore, the offered gates constitute universal set of quantum gates (see Eq. 5-7 in https://arxiv.org/pdf/2101.02993.pdf), especially this set is sufficient to implement any two-qubit unitary gate (see FIG. 5 in https://arxiv.org/pdf/2101.02993.pdf).

In the preferred embodiment the present invention was applied to the following noise channel $$N(X) = N_0 X N_0^\dagger + N_1 X N_1^\dagger \text{ where } N_0 =$$

$$\mathrm{diag}\left(1, 0, \frac{1}{\sqrt{2}}, \frac{1}{\sqrt{2}}\right) \text{ and } N_1 = \mathrm{diag}\left(0, 1, \frac{1}{\sqrt{2}}, \frac{1}{\sqrt{2}}i\right).$$

We have that $N_0 = U_0 \lambda_0 V$ and $N_1 = U_1 \lambda_1 V$ for $$V = \mathbb{1}_4,$$

$$U_0 = \mathbb{1}_4,$$

$$U_1 = \mathrm{diag}(1, 1, 1, i),$$

-continued $\lambda_0 = N_0,$ $\lambda_1 = \text{diag}\left(0, 0, \frac{1}{\sqrt{2}}, \frac{1}{\sqrt{2}}\right).$ We have that $|x_0\rangle, |x_1\rangle, |x_2\rangle, |x_3\rangle = |0\rangle, 0, \frac{1}{\sqrt{2}}|2\rangle, \frac{1}{\sqrt{2}}|3\rangle,$ $|y_0\rangle, |y_1\rangle, |y_2\rangle, |y_3\rangle = 0, |1\rangle, \frac{1}{\sqrt{2}}|2\rangle, \frac{1}{\sqrt{2}}i|3\rangle.$ This is in the third case of the creation of E, D matrices, with ($i_3=0$, $i_0=1$, $i_1=2$, $i_2=3$) hence the matrix M is as follows $$M = \begin{bmatrix} 0 & 0.5 & -0.5i \\ 1 & 0.5 & 0.5 \end{bmatrix}.$$

It is a subcase b) as rank(M)=2.
We take $j_1 = 0, j_2 = 2.$ Define $|E_0\rangle = |3\rangle, |D_0\rangle = |y_3\rangle = \frac{1}{\sqrt{2}}i|3\rangle.$ Now we calculate $(b_1, b_2)^T = \begin{bmatrix} 0 & 0.5 \\ 1 & 0.5 \end{bmatrix}^{-1} (-0.5i, 0.5)^T = (0.5 + 0.5i, -i)^T.$ Define $|E_1\rangle = |1\rangle + |2\rangle$ and $|D_1\rangle = (0.5 - 0.5i)|1\rangle + \frac{1}{\sqrt{2}}i|2\rangle$ Take $$E_* = \begin{bmatrix} 0 & 0 \\ 0 & 1 \\ 0 & 1 \\ 1 & 0 \end{bmatrix},$$

$$D_* = \begin{bmatrix} 0 & 0 & 0 & -\frac{1}{\sqrt{2}}i \\ 0 & 0.5 + 0.5i & -\frac{1}{\sqrt{2}}i & 0 \end{bmatrix}.$$

Take $$E = \begin{bmatrix} 0 & 0 \\ 0 & \frac{1}{\sqrt{2}} \\ 0 & \frac{1}{\sqrt{2}} \\ 1 & 0 \end{bmatrix}$$

$$D = \begin{bmatrix} 0 & 0 & 0 & -0.5i \\ 0 & 0.5 + 0.5i & -\frac{1}{\sqrt{2}}i & 0 \end{bmatrix}.$$

The probability of successful error correction is equal to p=0.25 and the unitary matrices are as follows $$U_E = \begin{bmatrix} 0 & 0 & 0 & 1 \\ 0 & \frac{1}{\sqrt{2}} & \frac{1}{\sqrt{2}} & 0 \\ 0 & -\frac{1}{\sqrt{2}} & \frac{1}{\sqrt{2}} & 0 \\ 1 & 0 & 0 & 0 \end{bmatrix},$$

$$U_D = \begin{bmatrix} 0 & 0 & 0 & 1 \\ 0 & -\frac{1}{\sqrt{2}}i & 0.5 - 0.5i & 0 \\ 0 & 0.5 + 0.5i & -\frac{1}{\sqrt{2}}i & 0 \\ 1 & 0 & 0 & 0 \end{bmatrix},$$

$$V_D = \begin{bmatrix} -0.5i & 0.5\sqrt{3} & 0 & 0 \\ 0.5\sqrt{3} & -0.5i & 0 & 0 \\ 0 & 0 & 1 & 0 \\ 0 & 0 & 0 & 1 \end{bmatrix}.$$

Below it is described how to implement the encoder and decoder according to the invention.

A quantum computer implemented encoder for a probabilistic error correction method for use with quantum circuits with a noise channel N(X) that has a Choi rank not greater than two, such as $N(X) = N_0 X N_0^\dagger + N_1 X N_1^\dagger$ and the encoder comprises an encoding module adapted to encode a first qubit into an encoded state $|\psi\rangle$, and put a second qubit into a ground state $|0\rangle$. This encoding module may be embodied in a standard architecture provided by IonQ. Architecture provided by IonQ offers ground state $|0\rangle$ preparation and an encoded state $|\psi\rangle$ preparation.

As it was indicated earlier by using a composition of gates GPI(0)GPI($\phi$)GPI2(0) it is possible to implement arbitrary rotation along Y-axis (in a Pauli basis). It is also possible to implement CNOT gate as it is shown in shown in technical documentation and at examples https://quantumai.google/cirq/tutorials/educators/ion_device. Therefore, the offered gates constitute universal set of quantum gates (see Eq. 5-7 in https://arxiv.org/pdf/2101.02993.pdf), especially this set is sufficient to implement any two-qubit unitary gate (see FIG. 5 in https://arxiv.org/pdf/2101.02993.pdf). Hence using the universal set of gates it is possible to achieve an encoder adapted to implement two qubit unitary operation $U_E$ on the first qubit and the second qubit to obtain an encoded state $U_E(|\psi\rangle \otimes |0\rangle)$, such as $U_E(1_2 \otimes |0\rangle) = E$ while E is an encoding matrix, and D is a decoding matrix such as $DN_0 E \propto 1_2,$ $DN_1 E \propto 1_2,$ $DN_0 E \neq 0 \lor DN_1 E \neq 0.$ The encoder according to the invention is preferably also adapted to receive an automatic resend request for the encoded state $|\psi\rangle$ on the first qubit, and further adapted to produce the encoded state $|\psi\rangle$ on the first qubit in response to the automatic resend request. This adaptation requires classic feedback loop between the decoder and the encoder.

In particular, the encoder is adapted to implement two qubit unitary operation characterized by $U_E$ as below:

$$U_E = \begin{bmatrix} 0 & 0 & 0 & 1 \\ 0 & \frac{1}{\sqrt{2}} & \frac{1}{\sqrt{2}} & 0 \\ 0 & -\frac{1}{\sqrt{2}} & \frac{1}{\sqrt{2}} & 0 \\ 1 & 0 & 0 & 0 \end{bmatrix}.$$

The same basic IonQ architecture can be used to implement a quantum computer implemented decoder for a probabilistic error correction method for use with quantum circuits with a noise channel N(X) that has a Choi rank not greater than two, such as $$N(X) = N_0 X N_0^\dagger + N_1 X N_1^\dagger$$

the decoder is adapted to receive a first qubit in an encoded state $|\psi\rangle$, and a second qubit into a ground state $|0\rangle$ after the encoded state and ground state are affected by the noise N(X), further the decoder is adapted to implement two qubit unitary operation $U_D$, such as $$(\mathbb{1}_2 \otimes \langle 0|) V_D (\mathbb{1}_2 \otimes |0\rangle) = D U_D^\dagger (\mathbb{1}_2 \otimes |0\rangle)$$

further the decoder is adapted to measure the second qubit in the standard basis to obtain a classical label i∈ {0,1}, and prepare a third qubit in the ground state $|0\rangle$, and implement two qubit unitary operation $V_D$ on the first qubit and the third qubit. Further the decoder is adapted to measure the third qubit in the standard basis to obtain a classical label j∈ {0,1}, and when (i,j)=(0,0) to accept as an output $\delta_{exp}$ a decoded state of the first qubit, and when (i,j)=(0,0) reject the output $\delta_{exp}$ of a decoded state of the first qubit.

Preferably the decoder according to this invention is adapted to initiate an automatic resend request for the encoded state $|\psi\rangle$ on the first qubit wherein the output $\delta_{exp}$ is rejected via classic feedback communication channel.

As the universal set of gates implemented in IonQ architecture is capable of implementing any unitary rotation IonQ architecture is sufficient to support adaptation of the decoder to implement two qubit unitary operations $U_D$, and $V_D$ such as $$U_D = \begin{bmatrix} 0 & 0 & 0 & 1 \\ 0 & -\frac{1}{\sqrt{2}}i & 0.5 - 0.5i & 0 \\ 0 & 0.5 + 0.5i & -\frac{1}{\sqrt{2}}i & 0 \\ 1 & 0 & 0 & 0 \end{bmatrix},$$

$$V_D = \begin{bmatrix} -0.5i & 0.5\sqrt{3} & 0 & 0 \\ 0.5\sqrt{3} & -0.5i & 0 & 0 \\ 0 & 0 & 1 & 0 \\ 0 & 0 & 0 & 1 \end{bmatrix}.$$

It shall be noted that despite the implementation of 2 qubit gates for unitary operations in IonQ architecture is preferable way of putting the invention into practice, any other gate-based quantum computer architecture is feasible to embody the presented invention.

The invention claimed is:

1. A probabilistic error correction method implemented on a quantum computing system for use with a communication channel N(X) that has a Choi rank not greater than two, such as $$N(X) = N_0 X N_0^\dagger + N_1 X N_1^\dagger$$

and the method comprising steps of:
encoding a first qubit into an encoded state $|\psi\rangle$,
putting a second qubit into an arbitrary fixed state $|d_1\rangle$,
implementing two qubit unitary operation $U_E$ on the first qubit and the second qubit to obtain an encoded state $U_E(|\psi\rangle \otimes |d_1\rangle)$, such as $$U_E(\mathbb{1}_2 \otimes |d_1\rangle) = E$$

while E is an encoding matrix, and D is a decoding matrix such as $$DN_0 E \propto \mathbb{1}_2,$$

$$DN_1 E \propto \mathbb{1}_2,$$

$$DN_0 E \neq 0 \vee DN_1 E \neq 0,$$

and after the encoded state is affected by the noise N(X), for arbitrary fixed state $|d_2\rangle$,
implementing two qubit unitary operation $U_D$, such as $\{U_D^\dagger |0, d_2\rangle, U_D^\dagger |1, d_2\rangle\}$ are right singular vectors of D, followed by
measuring the second qubit in an $\{|d_2\rangle, |d_2^\perp\rangle\}$ basis to obtain a classical label i∈ {0,1}, next
preparing a third qubit in the arbitrary fixed state $|d_3\rangle$, and
for an arbitrary fixed state $|d_4\rangle$, implementing two qubit unitary operation $V_D$ on the first qubit and the third qubit such as $$(\mathbb{1}_2 \otimes \langle d_4|) V_D (\mathbb{1}_2 \otimes |d_3\rangle) = D U_D^\dagger (\mathbb{1}_2 \otimes |d_2\rangle)$$

followed by measuring the third qubit in an $\{|d_4\rangle, |d_4^\perp\rangle\}$ basis measurement to obtain a classical label j∈ {0,1}, and
when (i,j)=(0,0) accepting as an output $\delta_{exp}$ a decoded state of the first qubit, and
when (i,j)≠(0,0) rejecting the output $\delta_{exp}$ of a decoded state of the first qubit,
wherein the arbitrary fixed states $|d_1\rangle$, $|d_2\rangle$, $|d_3\rangle$, $|d_4\rangle$ are the ground states $|0\rangle$,
wherein if the output $\delta_{exp}$ is rejected, the method further comprising a step of initiating an automatic resend request for the encoded state $|\psi\rangle$ on the first qubit.

2. The method according to claim 1, wherein the noise operators are given where $$N_0 = \text{diag}\left(1, 0, \frac{1}{\sqrt{2}}, \frac{1}{\sqrt{2}}\right) \text{ and } N_1 = \text{diag}\left(0, 1, \frac{1}{\sqrt{2}}, \frac{1}{\sqrt{2}}i\right),$$

the arbitrary fixed states are ground states $|0\rangle$,
the projective measurement basis is a standard basis, and $$U_E = \begin{bmatrix} 0 & 0 & 0 & 1 \\ 0 & \frac{1}{\sqrt{2}} & \frac{1}{\sqrt{2}} & 0 \\ 0 & -\frac{1}{\sqrt{2}} & \frac{1}{\sqrt{2}} & 0 \\ 1 & 0 & 0 & 0 \end{bmatrix},$$

-continued $$U_D = \begin{bmatrix} 0 & 0 & 0 & 1 \\ 0 & -\frac{1}{\sqrt{2}}i & 0.5 - 0.5i & 0 \\ 0 & 0.5 + 0.5i & -\frac{1}{\sqrt{2}}i & 0 \\ 1 & 0 & 0 & 0 \end{bmatrix},$$

$$V_D = \begin{bmatrix} -0.5i & 0.5\sqrt{3} & 0 & 0 \\ 0.5\sqrt{3} & -0.5i & 0 & 0 \\ 0 & 0 & 1 & 0 \\ 0 & 0 & 0 & 1 \end{bmatrix}.$$

3. An encoder for a probabilistic error correction method implemented on a quantum computing system for use with a communication channel N(X) that has a Choi rank not greater than two, such as $N(X)=N_0 X N_0^\dagger + N_1 X N_1^\dagger$ and the encoder comprises an encoding module adapted to encode a first qubit into an encoded state $|\psi\rangle$, and put a second qubit into an arbitrary fixed state $|d_1\rangle$, further the encoder is adapted to implement two qubit unitary operation $U_E$ on the first qubit and the second qubit to obtain an encoded state $U_E(|\psi\rangle \otimes |d_1\rangle)$, such as $U_E(\mathbb{1}_2 \otimes |d_1\rangle) = E$ while E is an encoding matrix, and D is a decoding matrix such as $DN_0 E \propto \mathbb{1}_2,$ $DN_1 E \propto \mathbb{1}_2,$ $DN_0 E \neq 0 \vee DN_1 E \neq 0,$ wherein the encoder is further adapted to receive an automatic resend request for the encoded state $|\psi\rangle$ on the first qubit, and to produce the encoded state $|\psi\rangle$ on the first qubit in response to the automatic resend request, wherein the arbitrary fixed state $|d_1\rangle$ of the second qubit is a ground state $|0\rangle$.

4. The encoder according to claim 3, wherein the encoder is adapted to implement two qubit unitary operation $U_E$ on the first qubit and the second qubit in a ground state $|0\rangle$, and the noise operators are given where $$N_0 = \mathrm{diag}\left(1, 0, \frac{1}{\sqrt{2}}, \frac{1}{\sqrt{2}}\right) \text{ and } N_1 = \mathrm{diag}\left(0, 1, \frac{1}{\sqrt{2}}, \frac{1}{\sqrt{2}}i\right),$$

to obtain an encoded state $U_E(|\psi\rangle \otimes |0\rangle)$, such as $$U_E = \begin{bmatrix} 0 & 0 & 0 & 1 \\ 0 & \frac{1}{\sqrt{2}} & \frac{1}{\sqrt{2}} & 0 \\ 0 & -\frac{1}{\sqrt{2}} & \frac{1}{\sqrt{2}} & 0 \\ 1 & 0 & 0 & 0 \end{bmatrix}.$$

5. A decoder for a probabilistic error correction method implemented on a quantum computing system for use with a communication channel N(X) that has a Choi rank not greater than two, such as $N(X)=N_0 X N_0^\dagger + N_1 X N_1^\dagger$ the decoder is adapted to receive a first qubit in an encoded state $|\psi\rangle$, and a second qubit into an arbitrary fixed state $|d_1\rangle$ after the encoded state and arbitrary fixed state are affected by the noise N(X), further the decoder is adapted to implement two qubit unitary operation $U_D$, such as $\{U_D^\dagger|0, d_2\rangle, U_D^\dagger|1, d_2\rangle\}$ are right-singular vectors of D for an arbitrary fixed state $|d_2\rangle$, further the decoder is adapted to measure the second qubit in an $\{|d_2\rangle, |d_2^\perp\rangle\}$ basis to obtain a classical label $i \in \{0,1\}$, and prepare a third qubit in the arbitrary fixed state $|d_3\rangle$, and for an arbitrary fixed state $|d_4\rangle$, implement two qubit unitary operation $V_D$ on the first qubit and the third qubit such as $(\mathbb{1}_2 \otimes \langle d_4|)V_D(\mathbb{1}_2 \otimes |d_3\rangle) = DU_D^\dagger(\mathbb{1}_2 \otimes |d_2\rangle)$ further the decoder is adapted to measure the third qubit in an $\{|d_4\rangle, |d_4^\perp\rangle\}$ basis measurement to obtain a classical label $j \in \{0,1\}$, and when (i,j)=(0,0) to accept as an output $\delta_{exp}$ a decoded state of the first qubit, and when (i,j)≠(0,0) to reject the output $\delta_{exp}$ of a decoded state of the first qubit, wherein the decoder is adapted to initiate an automatic resend request for the encoded state $|\psi\rangle$ on the first qubit if the output $\delta_{exp}$ is rejected, wherein the arbitrary fixed states $|d_1\rangle$, $|d_3\rangle$, $|d_4\rangle$ are the ground states $|0\rangle$.

6. The decoder according to claim 5, wherein the noise operators are given where $$N_0 = \mathrm{diag}\left(1, 0, \frac{1}{\sqrt{2}}, \frac{1}{\sqrt{2}}\right) \text{ and } N_1 = \mathrm{diag}\left(0, 1, \frac{1}{\sqrt{2}}, \frac{1}{\sqrt{2}}i\right),$$

the arbitrary fixed states are the ground states $|0\rangle$, and the decoder is adapted to implement two qubit unitary operation $U_D$, and $V_D$ such as $$U_D = \begin{bmatrix} 0 & 0 & 0 & 1 \\ 0 & -\frac{1}{\sqrt{2}}i & 0.5 - 0.5i & 0 \\ 0 & 0.5 + 0.5i & -\frac{1}{\sqrt{2}}i & 0 \\ 1 & 0 & 0 & 0 \end{bmatrix},$$

$$V_D = \begin{bmatrix} -0.5i & 0.5\sqrt{3} & 0 & 0 \\ 0.5\sqrt{3} & -0.5i & 0 & 0 \\ 0 & 0 & 1 & 0 \\ 0 & 0 & 0 & 1 \end{bmatrix}.$$

\* \* \* \* \*